United States Patent
Ranga et al.

(10) Patent No.: US 12,236,293 B1
(45) Date of Patent: Feb. 25, 2025

(54) SYSTEMS AND METHODS FOR MAINFRAME MESSAGING ABSTRACTION FRAMEWORK

(71) Applicant: Morgan Stanley Services Group Inc., New York, NY (US)

(72) Inventors: Sudesh Ranga, Maharashtra (IN); Neha Daga, Maharashtra (IN); Pallavi Patil, Maharashtra (IN); Rachit Mehrotra, Princeton, NJ (US); Michael Pinkerton, Hillsborough, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/420,904

(22) Filed: Jan. 24, 2024

(51) Int. Cl.
G06F 9/54 (2006.01)

(52) U.S. Cl.
CPC .................... G06F 9/546 (2013.01)

(58) Field of Classification Search
None
See application file for complete search history.

(56) References Cited

U.S. PATENT DOCUMENTS

| | | | |
|---|---|---|---|
| 6,060,911 A | 5/2000 | Schulz et al. | |
| 6,141,701 A * | 10/2000 | Whitney | G06F 9/546 709/215 |
| 7,152,094 B1 | 12/2006 | Jannu et al. | |
| 11,178,091 B1 | 11/2021 | Madhavan et al. | |
| 2007/0156737 A1 * | 7/2007 | Barnes | G06F 16/258 |
| 2009/0100402 A1 | 4/2009 | Heuler et al. | |
| 2013/0111500 A1 * | 5/2013 | Dixon | G06F 9/44 719/314 |
| 2014/0013337 A1 * | 1/2014 | Neft | G06F 8/71 719/314 |
| 2016/0337465 A1 * | 11/2016 | Tarre | G06F 9/00 |
| 2018/0338002 A1 * | 11/2018 | Sherrill | G06F 16/88 |
| 2019/0121681 A1 * | 4/2019 | Kelosky | G06F 8/315 |
| 2020/0059376 A1 * | 2/2020 | Slovetskiy | H04L 12/1877 |
| 2020/0311097 A1 * | 10/2020 | Ji | G06F 9/45529 |
| 2020/0382463 A1 * | 12/2020 | Garvey | H04L 51/226 |
| 2023/0004976 A1 | 1/2023 | Ghosh et al. | |
| 2023/0344885 A1 * | 10/2023 | Arnold | G06F 9/542 |

FOREIGN PATENT DOCUMENTS

WO   WO 2013000011 A1 *  1/2013 ............. H04L 69/02

* cited by examiner

*Primary Examiner* — Charles E Anya
(74) *Attorney, Agent, or Firm* — PEARL COHEN ZEDEK LATZER BARATZ LLP

(57) ABSTRACT

A system and methods for applications to use a plurality of messaging services with a mainframe system is provided. The system and methods can involve receiving requests via a client application interface (API) coupled to the mainframe system to consume or publish data by the applications and determining by the client application API a messaging service to be used. The system and methods can also involve converting the received requests into a process based on the messaging service to be used and a configuration that is based on the client application API's determination of which messaging service is to be used, and transmitting via a server application interface (API) coupled to the mainframe system the converted received requests to endpoints as defined by the requests.

12 Claims, 5 Drawing Sheets

SYSTEMS AND METHODS FOR MAINFRAME MESSAGING ABSTRACTION FRAMEWORK

FIELD OF THE INVENTION

The invention relates generally to systems and method for mainframe system messaging abstraction (MAB) for applications to use a plurality of services. More specifically, the invention relates to one or more applications connecting to a mainframe system in a manner that allows the application to remain service type agnostic.

BACKGROUND

Currently, typically for applications connected to a mainframe to use Message Queue (MQ) and Kafka messaging, each application is modified. MQ (Message Queue) and Kafka are both popular messaging systems typically used for building mainframe, distributed systems and streaming data processing applications.

MQ is a software pattern typically used for asynchronous communication between components, where messages are sent to and from a message queue. Kafka is a distributed streaming platform that can be used for, for example, building real-time data pipelines and/or streaming applications. Kafka can typically handle large volumes of data and can have a high throughput e.g., ~100 MB/s, which can allow it to be a good choice for use cases such as log aggregation, real-time analytics, and/or machine learning. Kafka uses a publish-subscribe model, where producers publish messages to topics, and consumers subscribe to these topics to receive the messages.

For an application developer working in a mainframe environment, typically the only ways to use the MQ Series or Kafka messaging are for an application developer to gain in-depth knowledge of MQ Series or Kafka, use its complex APIs, and code each application. This knowledge must be gained system wide and employed by any organization wishing to access the MQ Series or Kafka messaging for their application, which can be advantageous for specific business use cases. The requirement of coding each application can represents a substantial investment in knowledge not directly related to the primary application being developed, for example, as the primary application typically has nothing to do with the coding requirements of MQ series or Kafka, except for the fact that the applications need to communicate using these messaging formats. Accordingly, it can be desirable to enable various applications to use different messaging services (e.g., MQ series of Kafka) without requiring a code change to the application.

SUMMARY OF THE INVENTION

One advantage of the invention can include providing a standardized interface for accessing multiple protocol communications, e.g., MQ series or Kafka, such that applications themselves do not need to be modified in order access various protocols such, making it easier for developers to integrate any desired protocol into their applications.

Another advantage of the invention can include providing message transformation, routing, and filtering, which can simplify application development and reduce complexity.

Another advantage of the invention can include a faster time to market for applications, due to for example, saving time and costs to developers. Another advantage of the invention can include efficient maintenance due to, for example, the fact that is easier to create, update, and/or debug smaller services than larger blocks of code required with applications that include messaging service specific code.

Another advantage of the invention includes greater adaptability, as applications can be modernized with new protocols without having to change the application. Another advantage of the invention includes multiple integrations, for example, MQ and Kafka messaging together. Another advantage of the invention includes abstraction of MQ series and Kafka messaging software for CICS COBOL mainframe applications.

Another advantage of the invention include multi-threading, allowing parallel CICS online tasks to be initiated if, for example, the number of messages goes beyond a predefined threshold of messages on, for example, the MQ queue. Another advantage of the invention includes, data enrichment due to flexibility for applications for data enrichment (e.g., Cobol fixed format to JSON format and vice versa). Another advantage of the invention includes providing Kafka features similar to how one delivers semantics attaching Key-Headers to message streaming. Another advantage of the invention can include an ability to abstract without changes from application to, for example, move from legacy LU 6.2 to MQ. Another advantage of the invention can include allowing for additional protocols and message formats (e.g., JSON) to be integrated quickly into service catalogues.

The invention can involve a method for applications to use a plurality of messaging services with a mainframe system. The method can involve receiving requests via a client application interface (API) coupled to the mainframe system to consume or publish data by the applications. The method can involve determining by the client application API a messaging service to be used based on the received requests. The method can involve converting via the client server database the received requests into the processes of the plurality of processes of the plurality of messaging services based on the messaging service to be used and a configuration that is based on the client application API's determination of which messaging service is to be used. The method can involve transmitting via a server application interface (API) coupled to the mainframe system the converted received requests to endpoints as defined by the requests.

In some embodiments, the requests have uniform format for all applications. In some embodiments, the plurality of processes include MQ Get, MQ Put, Kafka subscribe, Kafka publish, and/or MQ+Kafka together.

In some embodiments, the plurality of messaging services are MQ Series, Kafka or both. In some embodiments, the endpoints are MQ, topic or both. In some embodiments, the method further comprising transforming one or more of the requests to a JSON format or XML format.

In some embodiments, the client application, client server database or both are mainframe to mainframe, mainframe to other domains, or other domains to the mainframe.

The invention can include a system for applications to use a plurality of messaging services with a mainframe system. The system can include a client application programming interface (API) coupled to the mainframe system to receive requests to consume or publish data by the applications. The system can include a client server database to store a plurality of configurations corresponding to a plurality of processes of each of the plurality of messaging services and convert the received requests into the processes of the plurality of processes of the plurality of messaging services based on particulars of the requests. The system can include a server application programming interface (API) coupled to the mainframe system to transmit the converted received requests to endpoints as defined by the requests.

In some embodiments, the requests have uniform format for all applications. In some embodiments, the plurality of processes include MQ Get, MQ Put, Kafka Get, Kafka Put, MQ+Kafka. In some embodiments, the plurality of messaging services are MQ Series, Kafka or both. In some embodiments, the endpoints are MQ, topic or both.

In some embodiments, the client server database is further configured to transform one or more of the requests to a JSON format.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention.

Figure 1:
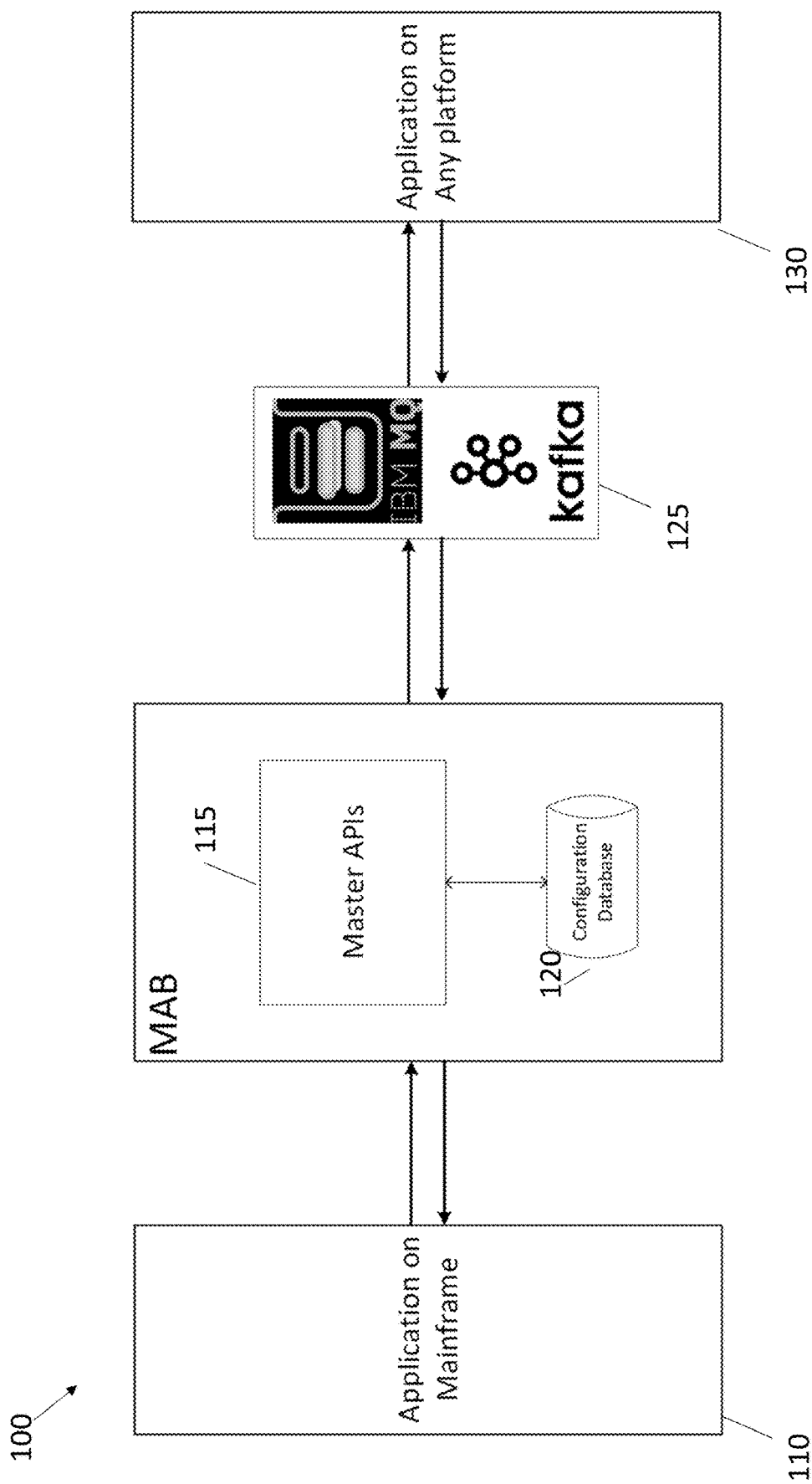
FIG. 1 is a diagram of a system architecture for applications to use a plurality of messaging services with a mainframe system, according to some embodiments of the invention.

FIG. 1 is a diagram of a system architecture 100 for applications to use a plurality of messaging services with a mainframe system, according to some embodiments of the invention.

The system architecture 100 can include an application on Mainframes 110, MAB Master APIs 115, a client service database 120, Messaging interface 125, and an application on any platform 130.

The application 110 can communicate with the MAB Master APIs 115. The client application 110 resides on a mainframe.

The MAB Master APIs 115 can communicate with the application 110, the client service database 120 and messaging interface 125

The client service database 120 can communicate with the MAB Master APIs 115.

The messaging interface 125 can communicate with the MAB Master APIs 115 and application 130. The application 130 can reside on a mainframe or other platforms. The communication can be wired or wireless.

During operation, the application 110 can transmit one or more requests to (e.g., to consume or publish data) or receive one or more requests (e.g., to put or reply).

In the embodiment of the application 110 transmitting one or more requests, the requests can indicate the use of standard protocols, standard mainframe framework functions and/or additional functions (e.g., MQ Get, MQ Put, Kafka subscribe, Kafka Publish and/or MQ+Kafka). The requests can be transmitted to the MAB Master APIs 115. The MAB Master APIs 115 can determine the protocol that corresponds to the one or more requests and transmit the one or more requests and the determination to the client service database 120. The one or more requests can be received by the client service database 120. The client service database 120 can retrieve a configuration based on the one or more requests and the determination and convert the received one or more requests into a process of a plurality of processes it has stored such the one or more requests can be executed. The MAB Master APIs 115 can transmit the converted received request to the Messaging Interface 125. The Messaging Interface 125 can transmit the converted received request to its endpoint e.g., application 130. In some embodiments, if the endpoint is not capable of receiving the request in the format of the request then the MAB Master API 115 can convert the request based on configurations retrieved from client service database and transmit the converted request to the application API 130 using Messaging Interface 125. In some embodiments, the endpoint is capable of receiving the request in the converted format and no further conversion is necessary.

For example, the application 110 can transmit a request with header containing 'Service' and data request 'Function value'. Assume, in this example, the data request header fields 'Function Type' contains 'Put request' with valid 'service Name.' The MAB Master APIs 115 can detect that the request is a 'Put request' from the header data request function value. The client API 115 can transmit the request and an indication that the request is a 'Put request' and the service name passed from application 110 to the client service database 120. The indication can be a field in the request that specifies the type of message. For example, a destination parameter can be defined in the request that indicates the messaging service e.g. MQ for MQ Put, KFK for Kafka and/or MQKFK for both.

The client service database 120 can retrieve configuration parameters to convert the received request to an 'MQ Put'. The 'MQ Put' is executed, such that a 'MQ Put' request is sent to the Messaging Interface 125. The Messaging Service 125 communicates with the application 130(e.g., endpoint) for the 'MQ Put'.

During operation, the application 130 can execute a similar process such that one or more requests (e.g., consume or reply) can be sent that indicates the use of standard protocols, standard mainframe framework functions and/or additional functions (e.g., MQ Get, Kafka Publish and/or MQ+Kafka). The requests can be transmitted to the Messaging Interface 125. The Messaging Interface 125, e.g., by using standard protocols, can trigger a 'transmit' request to the MAB Master APIs 115. The MAB Master APIs 115 can transmit the one or more requests and the determination to the client service database 120. The one or more requests can be received by the client service database 120. The client service database 120 can retrieve a configuration based on the one or more requests into a process of a plurality of processes it has stored such the one or more request can be executed. The client service database 120 can transmit configuration parameters for a received request to the MAB Master APIs 115. The MAB master API 115 can convert the received request based on parameters passed from client service database 120. MAB Master APIs can transmit the converted received request to its endpoint (e.g., an application 110). In some embodiments, if the endpoint is not capable of receiving the request in the format of the request (e.g., application 110), then the MAB Master API 115 can convert the request based on configuration parameters from client service database 120 into the protocol of the application API 110. In some embodiments, the endpoint is capable of receiving the request in the converted format and no further conversion is necessary.

In various embodiments, there are n number of applications 110 and m number of applications 130 where n and m are an integer values.

Figure 2:
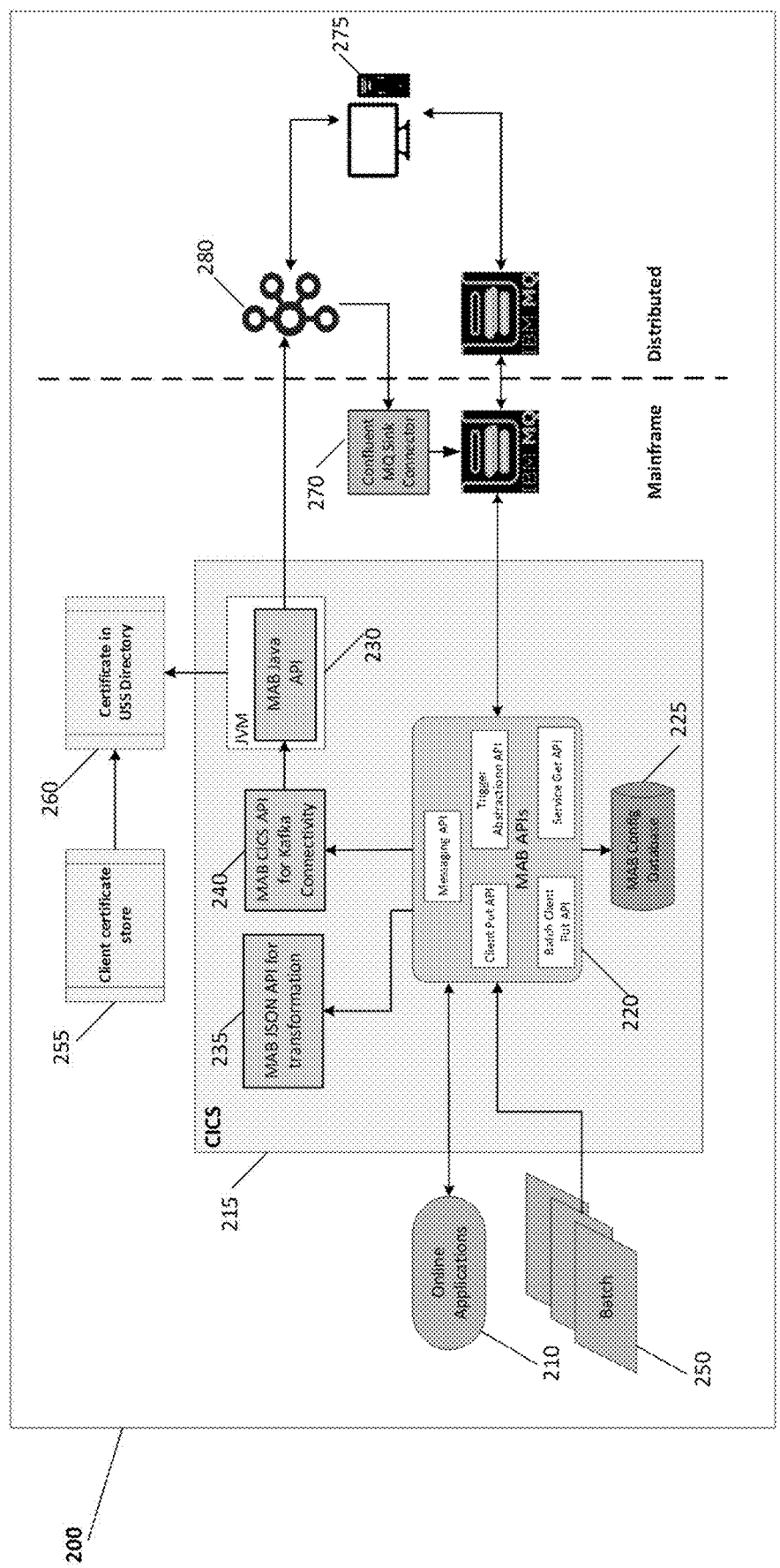
FIG. 2 is a diagram of a component level architecture for applications to use a plurality of messaging services with a mainframe system, according to some embodiments of the invention.

FIG. 2 is a diagram of a component level architecture 200 for applications to use a plurality of messaging services with a mainframe system, according to some embodiments of the invention.

The component level architecture 200 includes a plurality of online application 210, Customer Information Control System (CICS) 215, application interfaces 220, configuration database 225, a java virtual machine (JVM) 230 including a Java API, JSON transformation module 235, KAFKA connectivity module 240, batch 250, a client certificate store 255, a certificate in USS directory 260, a confluent MQ sink connector 270, a computer 275 and a Kafka Topic 280.

The plurality of online applications 210 and/or the batch processes 250 can communicate to the application interface 220 on the CICS 215 to send requests.

The plurality of applications 210 can be real time business processing applications. The batch processes 250 can be business processes running at a particular frequency (e.g., daily, weekly, monthly). In some embodiments, the batch processes 250 are for certain applications which perform end of day, week and/or month processing via the mainframe batch jobs and have messages which can be sent to another application using MQ.

The plurality of applications 210 and/or batch processes 250 can transmit requests in any protocol. In some embodiments, the request can include multiple protocols. For example, a request can include both Kafka and MQ. The requests can include unform data items. For example, the request can be in multiple protocol formats (e.g., and be converted), while the interface between the plurality of applications 210 and the CICS 215 can have particular data items. The data items can include Application service name, application Client name, Application Message Id, Message Length, Response Indicator and/or Function Type (PUT and/or other function types as are known in the art).

In some embodiments, client service database includes a destination field. The destination field can specify for a put request, whether it was Kafka or MQ. Table 1 shows an example of a destination input field for requests::

TABLE 1

Destination: destination configuration
DEST: MQ --> For MQ PUT case
DEST: KFK --> For Kafka PUT case
DEST: MQKFK --> For MQ + Kafka PUT both The requests can be transmitted to the application interfaces 220 (e.g., MAB Master API 115, as described above in FIG. 1).

The application interfaces 220 can communicate the requests to the configuration database 225 (e.g., client service database 120, as described above in FIG. 1). The application interfaces 220 can include MAB Master APIs 115, as described above in FIG. 1.

In various embodiments, each application of the application interfaces 220 for MQ are invoked (e.g., via CICS Link) by a Master program written to retrieve the messages from the MQ or it can be invoked by the application in the MQ Put process. MAB API expects the calling program to pass the parameters related to function to be performed, return code, reason code etc.

In various embodiments, for MQ Put messaging the application interfaces 220 can perform an identify service. The identify service can perform pre-requisites for MQ Put, e.g., initialize temporary data area, read the client service database 225 to validate service details, establish MQ connection, allocate a reply queue data, and/or write identify activity log record.

In various embodiments, for MQ messaging the application interfaces 220 can perform an Identify Client. The Identify Service can initialize the data area, client service database 225, open the output request queue, open the input reply queue, and/or write identify activity log record.

In various embodiments, for MQ messaging the application interfaces 220 can perform a reset. The reset can close request queue, close reply to queues and/or write reset activity log record. Closing the queue can include closing the MQ connection after the message has been put to the MQ In various embodiments, for MQ messaging the application interfaces 220 can perform a MQ Get Request/Reply. The MQ Get Request/Reply can initialize wait interval process, get MQ Buffer to hold user buffer length and cobol request header and/or call MQGET. The initialize wait interval process can involve initializing a wait period between processing of messages. The MQ Buffer can involve getting the storage data area for storing the application message and header if present.

In various embodiments, for MQ messaging the application interfaces 220 can perform a MQ Put Reply. The MQ Put Reply can initialize MQMD and PUT options, response to message from broker—Build message type & Create MQ Buffer with or without Header, check if in PUT loop, and/or MQPUT or MPPUT1 to send message.

In various embodiments, for MQ messaging the application interfaces 220 can perform a MQ Put Request. The MQ Put Request can setup MQ PUT options, check if message needs to be JSON transformed or not. If needed then call the MAB JSON transformer API using the application JSON transformer to convert the Cobol fixed length format message to JSON format. The MQ Put Request can if Cobol Header required build message type. The MQ Put Request can allocate MQ Buffer for required size—User size with or without header, check if in PUT loop and/or MQPUT or MPPUT1 to send message.

In various embodiments, for Kafka messaging the application interfaces 220 can perform a Kafka Produce/Put request. The Kafka Produce/Put request can check if the message is to be JSON transformed or not. If the message can be JSON transformed, then the JSON transformer API 230 can be called using the application JSON transformer 235 to convert the Cobol fixed length format message to JSON format. The Kafka Produce/Put request can call the Kafka API to produce the message to the Kafka Topic.

In various embodiments, the Kafka get/consume request can involve using the Confluent MQ sink connector 270. The MQ sink connector 270 can integrate Kafka with IBM MQ. The Confluent MQ sink connector 270 can consumes records from Kafka topic(s) and converts each record value to either a JMS TextMessage or BytesMessage before producing the JMS Message to IBM® MQ. The Confluent MQ sink connector 270 can maintain all the config mappings of Kafka Topic to MQ via confluent provided Rest APIs with the product. As is known to one of ordinary skill in the art, the Confluent MQ sink connector includes other functions.

In various embodiments, for MQ and Kafka messaging together the application interfaces 220 can perform a MQ Put and Kafka Produce to allow sending the same message to the MQ and the Kafka. This can allow, for example, applications to initially send the message to both destination MQ & Kafka, so that, for example, if they face any issue in modern workflow using Kafka then they can easily switch to legacy workflow using MQ by just changing the Client configuration Destination. The flow remains same for MQ & Kafka Put/Produce as described in detail in earlier sections.

The configuration database 225 can include client information and service information. In some embodiments, the configuration database 225 includes two DB2 tables. In various embodiments, there is a service table and a client table.

The service table can have configurations related to the service used by applications to consume messages from their application queue. One or more columns of the service table can include configuration parameters as follows:

Service name—a name used for uniquely identifying configuration parameters for an application specific setup; Processing programs—an application program that can perform business logic and/or functions;
initialization program—program to perform any actions required by application before processing gets started;
level of logging—log level values which can be used to get tracing information. N—NO, A—ALL, W—WARNINGS, E—ERRORS, Q—QUIT;
Error threshold parameters—threshold value for number of error messages after which the service can be shut;
process and drop message log file entries—file names for processed and dropped messages, respectively;
Shut flag—service status flag, Values Y/N;
request-reply flow flags—Flag to indicate whether it's a request only flow (unidirectional) or request and reply flow (bi-directional);
Persistence flag—Flag to indicate if messages in MQ will be persisted after put or will be deleted after put1

Max messages to be processed in single CICS task—maximum number of messages one task will process.
MQ Get Wait time—Time for which a task will wait for messages to be available in MQ before a task will be terminated;
Retry count—in case of failure for MQ put, number of retries to be performed before dropping the message; and/or
Backout count—Number of messages which were rolled back due to any error. Once this threshold is reached service is shut.

The client table can have configurations related to clients that are associated respective services that are used by applications to assign messages to their respective MQ or Kafka topic. One or more columns of the client table can include: Client Name, Associated Service name (holds queue name for Put), Kafka Topic property file location, Destination (MQ or Kafka or both MQ+Kafka), Persistence flag, Put One flag, CICS JSON Transformer Name, retry count, Backout count, reply queue & queue manager names.

Authentication between CICS and Kafka can be established via 'Mutual TLS' security mechanism by issuing certificates. These certificates can be stored in certs store on Mainframe 255 and copied to USS directory 260 on Mainframe for MAB Java API 230 to read In various embodiments, requests, messages, whether they are processed, dropped, and/or replied to can be logged. In various embodiments, the messages are logged on a VSAM file. The VSAM file can be KSDS file with key as 36 bytes.

For example, successfully processed messages can be logged on a VSAM file where one service definition the parameter is 'PROCESSED FCT' and one client definition the parameter is 'PUT-REQUEST FCT'. Dropped message can be logged on a VSAM file where the service definition the parameter can be 'DROP FCT' and on client definition the parameter can be 'DROP-FCT'. Reply messages can be logged on a VSAM file on the service and client definitions as the parameter 'REPLY FCT'.

In some embodiments, trace logging can be performed.

Figure 3:
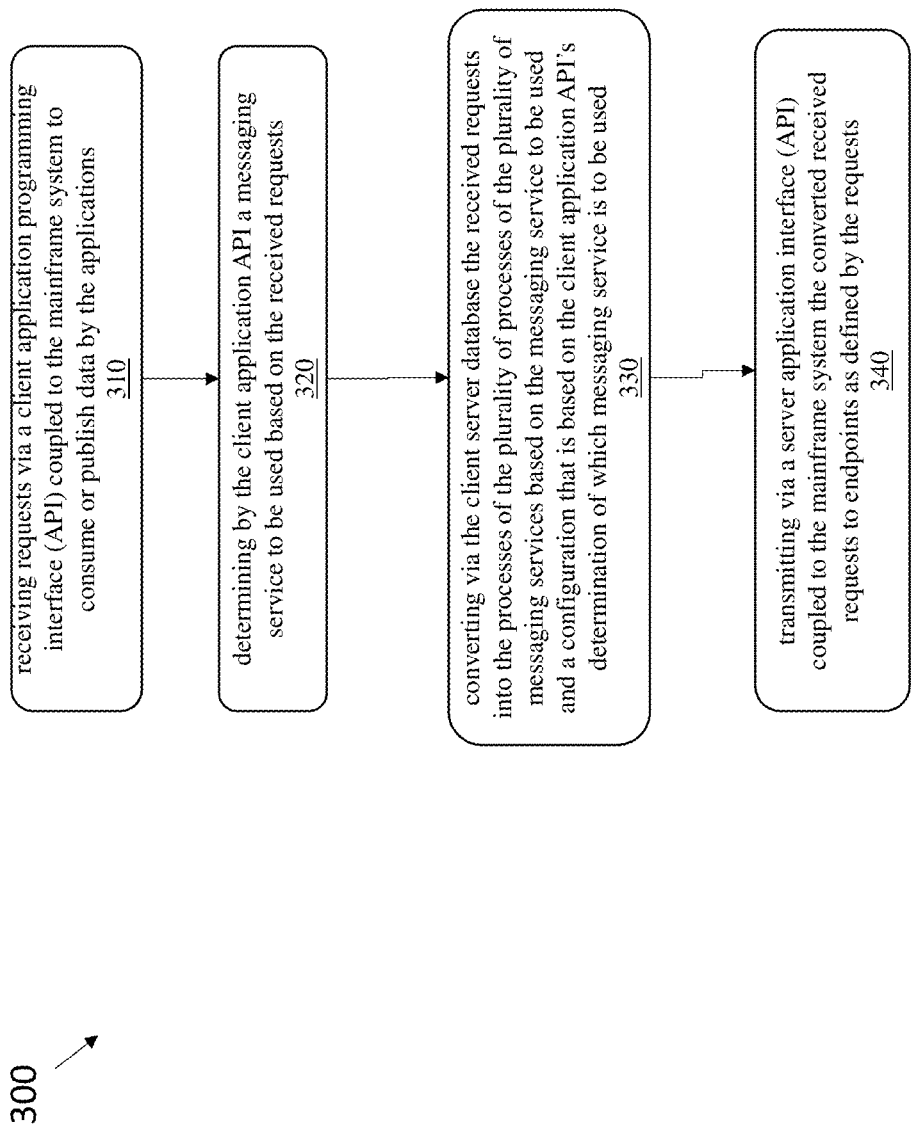
FIG. 3 is flowchart for a method or applications to use a plurality of messaging services with a mainframe system, according to some embodiments of the invention.

FIG. 3 is flowchart for a method 300 for applications to use a plurality of messaging services with a mainframe system (e.g., mainframe as described above in FIG. 1 and FIG. 2), according to some embodiments of the invention.

The method can involve receiving requests via a client API (e.g., client API 115 as described above in FIG. 1) coupled to the mainframe system to consume or publish data by the applications (Step 310).

The method can also involve determining by the client application API a messaging service to be used based on the received requests (Step 320).

As described above, each application can transmit requests in a format that unrelated to the protocol of the messaging service to be used. For example, for messaging services of Kafka and MQ there is a specific protocol for these requests. Thus, in order for an application to use these messaging services, the requests must be in the proper format. The client API can determine what messaging service the requests is to be sent with when applications send the request.

In some embodiments, the request is for a MQ messaging service. In some embodiments the request is for a Kafka messaging service. In some embodiments, the request is for both MQ and Kafka messaging services.

As is apparent to one of ordinary skill in the art, while Kafka and MQ are described herein, other protocols can be used.

The method can also involve converting via the client service database the received requests into the processes of the plurality of processes of the plurality of messaging services based on the messaging service to be used and a configuration that is based on the client application API's determination of which messaging service is to be used. (Step 330).

The configuration population can occur when an application registers with the system. There can be a field in client service database called Destination it can have values MQ, KFK, MQKFK that can specify which configuration to use. For converting request there can be a field in client service database MQ XFMR TYPE. This field can include JSON transformation type set up for MQ destination. MQ XFMR TYPE expected values can include:
- D2J→To convert Cobol based positional application data to JSON format;
- J2D →To convert JSON format message to Cobol based positional format; and/or
- (spaces/blank)→Leave blank if no transformation required.

For converting request there can be a field in client service database Kafka XFMR TYPE. This field can include JSON transformation type set up for Kafka destination. The XFMR TYPE field can have expected values:
- D2J→To convert Cobol based positional application data to JSON format;
- J2D→To convert JSON format message to Cobol based positional format; and/or
- (spaces/blank)→Leave blank if no transformation required.

The method can also involve transmitting via a service application programming interface (API) coupled to the mainframe system the converted received requests to endpoints as defined by the requests (Step 340). In some embodiments, the endpoint is MQ and/or Kafka Topic.

As described above, in various embodiments, the requests are Kafka and/or MQ requests.

Figure 4:
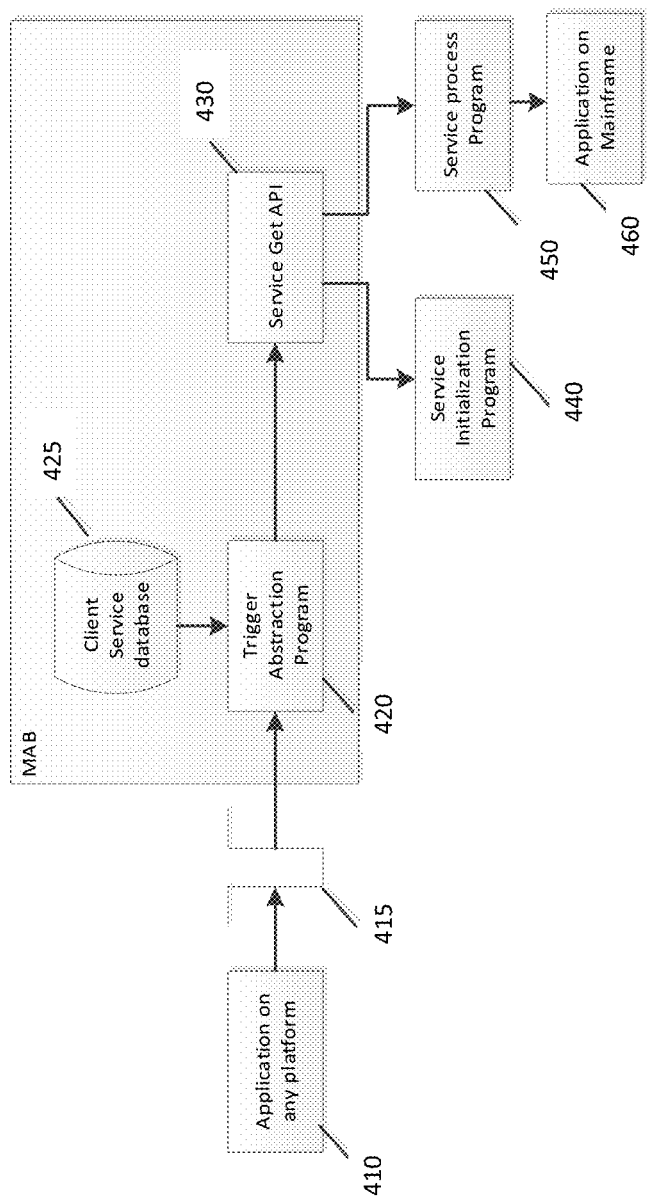
FIG. 4 shows a component level architecture for applications to use a plurality of messaging services with a mainframe system, according to some embodiments of the invention.

In some embodiments, the client application and/or service application (e.g., as described above in FIG. 1), can transmit a request that indicates an MQ Get request. Turning to FIG. 4, FIG. 4 shows a component level architecture 400 for applications to use a plurality of messaging services with a mainframe system, according to some embodiments of the invention. For example, a MQ Get request can flow through the component level architecture 400 of the mainframe system.

The component level architecture 400 includes one or more applications on any platform 410, one or more messaging interfaces 415, a MAB trigger abstraction API 420, a MAB client service database 425, a MAB service get API 430, an application service initialization program 440, application service process program 450, and an application on mainframe 460.

During operation, one or more messages can be placed into the one or more messaging interfaces 415 (e.g., for an MQ Get message, this can be one or more MQ APIs) by one application of the one or more applications 410. One or more messages put on all MQs APIs 415 can invoke the MAB trigger abstraction API 420.

The MAB trigger abstraction API 420 from can read a message from the MQ APIs 415 (e.g., a trigger message) and get the name of the message queue where the original application message resides. Using the queue name as a key, a request from the MAB trigger abstraction API 420 can read the MAB client service database 425 to get service details.

MAB trigger abstraction API 420 can check the service status from MAB client service database 425. If the service has a "SHUT" status, then message process flow can be stopped and a message saying that 'Service has SHUT status' can be logged in a MAB logging file. If the service has an "UNSHUT" status, then the MAB trigger abstraction API 420 from can invoke processing of the application. A number of application parallel tasks to start can be a configurable parameter. This can be useful for applications which can perform parallel processing for faster consumption.

The MAB service get API 430 can retrieve all the information passed by the MAB trigger abstraction program 420, for example, service name and/or application program names. The MAB service get API 430 can call an application service initialization program 440 to perform pre-requisite actions required by application and/or get a maximum length of the message to be read from MQ.

The MAB service get API 430 can retrieve the message from the service request queue on messaging interfaces 415.

The MAB service get API 430 can call an application provided processing program 450 to execute business logic and/or functions from an application on the mainframe 460.

In some embodiments, the client application and/or service application (e.g., as described above in FIG. 1), can transmit a request that indicates a Kafka Put. For a Kafka Put, inputs as shown below in Table 2 can be received in the request:

TABLE 2

| Parameter | Description | Expected Values |
|---|---|---|
| Destination | This field can have destination configured | For Kafka PUT case: KFK; For MQ + Kafka PUT both: MQKFK |
| Kafka PROP File | This field can hold the Mainframe Unix location of a property file. The property file can have Kafka connection details configured which can be used by JAVA Kafka API for Kafka PUT. | |
| MQ XFMR TYPE | This field can have JSON transformation type set up for MQ destination. | To convert Cobol based positional application data to JSON format: D2J; To convert JSON format message to Cobol based positional format: J2D; or Leave blank if no transformation required: (spaces/blank) |

TABLE 2-continued

| Parameter | Description | Expected Values |
|---|---|---|
| Kafka XFMR TYPE | This field can have JSON transformation type set up for Kafka destination. | To convert Cobol based positional application data to JSON format: D2J; To convert JSON format message to Cobol based positional format: J2D; or Leave blank if no transformation required: (spaces/blank) |
| JSON XFMR | This field will hold the JSON transformer bundle name which will be used by JSON API while transforming the message | Alphanumeric eight chars name i.e. - MABDHDR1 |
| Property File set up | Property file would have standard Kafka connection details such as bootstrap servers, certificate details, acks, retries etc. along with Kafka Topic Name which will be used by JAVA Kafka API for Kafka PUT | Standard parameters as is known in the art. For example, https://kafka.apache.org/documentation/ |

In some embodiments, there can be additional properties to identify message structure sent by application which can assist in understanding whether a message contains a key, one or more headers, a payload and/or instructions regarding how to fetch any of the preceding from the payload. The additional properties can be as shown in Table 3 below.

TABLE 3

| Parameter | Description | Expected Values |
|---|---|---|
| mabkey | Whether or not the message contains a key to be sent along the payload to Kafka Topic | Y N |
| mabkeylength | 0 means that message contains JSON based key attached with "mabkey". Greater than 0 value will mean it's a positional key starting from offset 0 and length provided by this parameter | 0 Greater than 0 |
| mabheader | Whether or not the message containers one or more headers to be sent along the payload to the Kafka Topic. | Y N |
| mabhdrlength | 0 means that message contains JSON based header attached with "mabheader". Greater than 0 value will mean it's a positional header starting from offset provided by parameter mabhdroffset and length provided by this parameter. | 0 Greater than 0 |
| mabhdroffset | When mabhdrlength parameter has value Greater than 0 then mabhdroffset will provide the offset from starting position where headers will start. | 0 Greater than 0 |
| Kafka TOPIC set up | Kafka Topic | |

Applications can make requests via a CICS LINK call to MAB Messaging Interface API for Kafka PUT request (e.g., similar to BAU MQ PUT request, by passing MAB service name, payload and Function type to MAB API). In some embodiments, the payload is the message which the application sends and/or the Function Type is a put function that can tell the API that the message sent by the application needs to be sent to configured destination.

In some embodiments, a MAB Java Kafka API is called in real-time to send messages to KAFKA on the mainframe system. The MAB Java Kafka API can fetch the message to be transmitted to a destination Kafka Topic. The MAB Java Kafka API can check the destination topic name in configuration database to know where message needs to be sent. The MAB Java Kafka API can send the message to Kafka Topic using standard Kafka send function.

In some embodiments, if the Kafka Put is successful it returns a zero, otherwise a non-zero return code can be returned to the application. If the application receives a non-zero return code it can handle as an error message.

Figure 5:
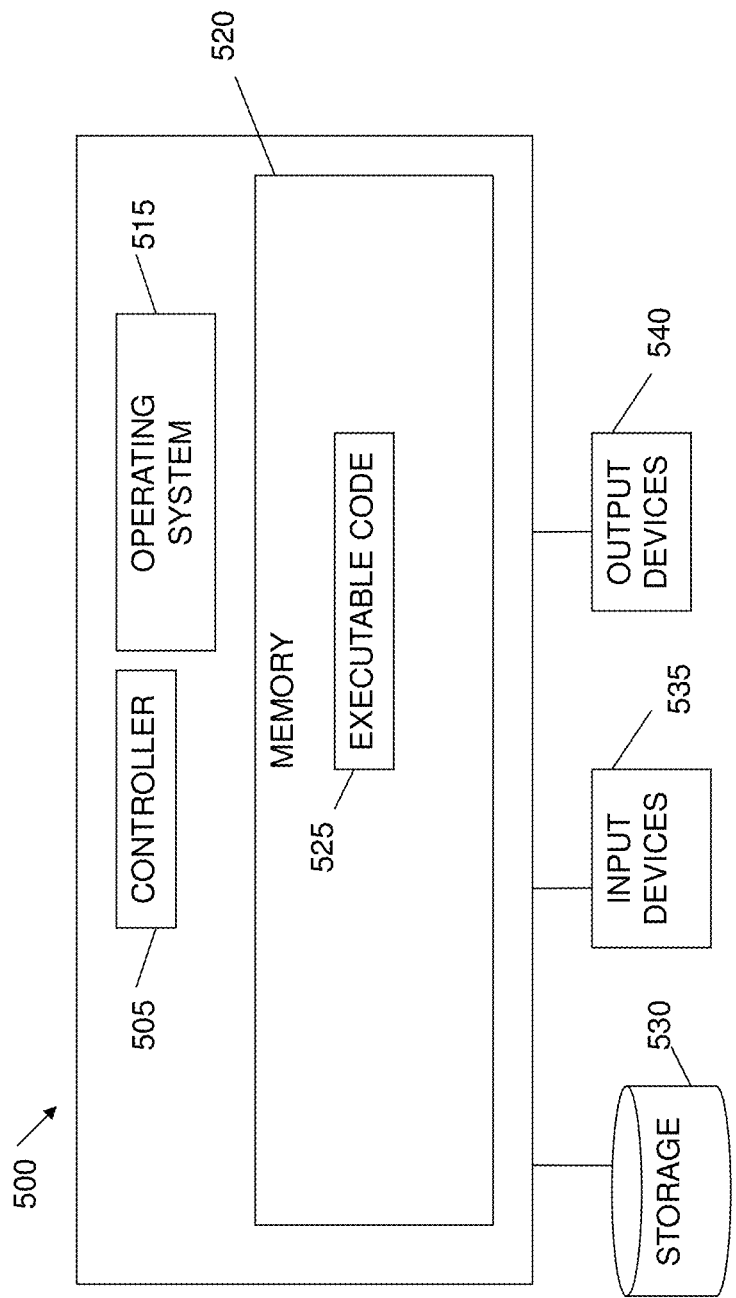
FIG. 5 shows a block diagram of a computing device 500 which can be used with embodiments of the invention.

FIG. 5 shows a block diagram of a computing device 500 which can be used with embodiments of the invention. Computing device 500 can include a controller or processor 505 that can be or include, for example, one or more central processing unit processor(s) (CPU), one or more Graphics Processing Unit(s) (GPU or GPGPU), a chip or any suitable computing or computational device, an operating system 515, a memory 520, a storage 530, input devices 535 and output devices 540.

Operating system 515 can be or can include any code segment designed and/or configured to perform tasks involving coordination, scheduling, arbitration, supervising, controlling or otherwise managing operation of computing device 500, for example, scheduling execution of programs. Memory 520 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 can be or can include a plurality of, possibly different memory units. Memory 520 can store for example, instructions to carry out a method (e.g. code 525), and/or data such as user responses, interruptions, etc.

Executable code 525 can be any executable code, e.g., an application, a program, a process, task or script. Executable code 525 can be executed by controller 505 possibly under control of operating system 515. For example, executable code 525 can when executed cause masking of personally identifiable information (PII), according to embodiments of the invention. In some embodiments, more than one computing device 500 or components of device 500 can be used for multiple functions described herein. For the various modules and functions described herein, one or more computing devices 500 or components of computing device 500 can be used. Devices that include components similar or different to those included in computing device 500 can be used, and can be connected to a network and used as a system. One or more processor(s) 505 can be configured to carry out embodiments of the invention by for example executing software or code. Storage 530 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 530 and can be loaded from storage 530 into a memory 520 where it can be processed by controller 505. In some embodiments, some of the components shown in FIG. 3 can be omitted.

Input devices 535 can be or can include for example a mouse, a keyboard, a touch screen or pad or any suitable input device. It will be recognized that any suitable number of input devices can be operatively connected to computing device 500 as shown by block 535. Output devices 540 can include one or more displays, speakers and/or any other suitable output devices. It will be recognized that any suitable number of output devices can be operatively connected to computing device 500 as shown by block 540. Any applicable input/output (I/O) devices can be connected to computing device 500, for example, a wired or wireless network interface card (NIC), a modem, printer or facsimile machine, a universal serial bus (USB) device or external hard drive can be included in input devices 535 and/or output devices 540.

Embodiments of the invention can include one or more article(s) (e.g. memory 520 or storage 530) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input. The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

The invention claimed is:

1. A method for applications to use a plurality of messaging services with a mainframe system, the method comprising:

receiving requests via a client application interface (API) coupled to the mainframe system to consume or publish data by the applications, wherein the requests can be sent in any protocol;

determining by the client application API a messaging service to be used based on the received requests;

converting via the client server database the received requests into processes of a plurality of processes of the plurality of messaging services based on the messaging service to be used and a configuration that is based on the client application API's determination of which messaging service is to be used, wherein the client server database is read using a queue name as a key and a request from a messaging abstraction (MAB) trigger abstraction API to get the messaging service details to determine the messaging service status, and wherein the plurality of processes include MQ Get, MQ Put, Kafka subscribe, Kafka publish, and MQ and Kafka together; and transmitting via a server application interface (API) coupled to the mainframe system the converted received requests to endpoints as defined by the requests, wherein the endpoint remains unchanged when the protocol that the request was sent in is different than a protocol used by the selected messaging service.

2. The method of claim 1 wherein the requests have uniform format for all applications.

3. The method of claim 1 wherein the plurality of messaging services are MQ Series, Kafka topic or both.

4. The method of claim 1 wherein the endpoints are MQ series, Kafka topic or both.

5. The method of claim 1 further comprising transforming one or more of the requests to a JSON format or XML format.

6. The method of claim 1 wherein the client application, the client server database or both are mainframe to mainframe, mainframe to other domains, or other domains to the mainframe.

7. A non-transitory computer program product comprising instructions which, when the program is executed cause a processor to:

receive requests via a client application interface (API) coupled to a mainframe system to consume or publish data by the applications, wherein the requests can be sent in any protocol;

determine by the client application API a messaging service to be used based on the received requests;

convert via the client server database the received requests into processes of a plurality of processes of the plurality of messaging services based on the messaging service to be used and a configuration that is based on the client application API's determination of which messaging service is to be used, wherein the client server database is read using a queue name as a key and a request from a messaging abstraction (MAB) trigger abstraction API to get the messaging service details to determine the messaging service status, and wherein the plurality of processes include MQ Get, MQ Put, Kafka subscribe, Kafka publish, and MQ and Kafka together; and transmit via a server application interface (API) coupled to the mainframe system the converted received requests to endpoints as defined by the requests, wherein the endpoint remains unchanged when the protocol that the request was sent in is different than a protocol used by the selected messaging service.

8. The non-transitory computer program product of claim 7 wherein the requests have uniform format for all applications.

9. The non-transitory computer program product of claim 7 wherein the plurality of messaging services are MQ Series, Kafka topic or both.

10. The non-transitory computer program product of claim 7 wherein the endpoints are MQ Series, Kafka topic or both.

11. The non-transitory computer program product of claim 7 wherein the processor is further configured to transform one or more of the requests to a JSON format or XML format.

12. The non-transitory computer program product of claim 7 wherein the client application, the client server database or both are mainframe to mainframe, mainframe to other domains, or other domains to the mainframe.

* * * * *